(12) United States Patent
Joshi et al.

(10) Patent No.: US 9,558,028 B2
(45) Date of Patent: Jan. 31, 2017

(54) SYSTEMS AND METHODS FOR MIGRATION OF VIRTUAL MACHINES ACROSS VIRTUAL STORAGE RESOURCES

(71) Applicant: Dell Products L.P., Round Rock, TX (US)

(72) Inventors: Neeraj Joshi, Puducherry (IN); Kavi K. Chakkravarthy, Vellore (IN); Vishnu Murty Karrotu, Bangalore (IN); Krishnaprasad Koladi, Bangalore (IN); Kiran Kumar Devarapalli, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/596,588

(22) Filed: Jan. 14, 2015

(65) Prior Publication Data
US 2016/0203015 A1    Jul. 14, 2016

(51) Int. Cl.
*G06F 11/00* (2006.01)
*G06F 9/455* (2006.01)
*G06F 9/50* (2006.01)

(52) U.S. Cl.
CPC ......... *G06F 9/45558* (2013.01); *G06F 9/5077* (2013.01); *G06F 2009/4557* (2013.01); *G06F 2009/45579* (2013.01)

(58) Field of Classification Search
CPC .................................................. G06F 9/45558
USPC ....... 714/4.1, 4.11, 4.12, 4.2, 6.1, 6.11, 6.32
See application file for complete search history.

(56) References Cited

U.S. PATENT DOCUMENTS

| 5,371,882 | A  | * | 12/1994 | Ludlam | G06F 11/2094 |
| | | | | | 714/6.32 |
| 5,727,144 | A  | * | 3/1998 | Brady | G06F 11/004 |
| | | | | | 714/57 |
| 8,650,435 | B2 | | 2/2014 | Vishnu et al. | |
| 8,874,961 | B2 | * | 10/2014 | Pillai | G06F 11/2023 |
| | | | | | 709/223 |
| 2004/0260967 | A1 | * | 12/2004 | Guha | G06F 11/008 |
| | | | | | 714/3 |
| 2009/0138752 | A1 | * | 5/2009 | Graham | G06F 11/1484 |
| | | | | | 714/4.1 |
| 2011/0072208 | A1 | | 3/2011 | Gulati et al. | |
| 2011/0252271 | A1 | * | 10/2011 | Frenkel | G06F 11/0712 |
| | | | | | 714/4.1 |

(Continued)

*Primary Examiner* — Dieu-Minh Le
(74) *Attorney, Agent, or Firm* — Jackson Walker L.L.P.

(57) ABSTRACT

In accordance with these and other embodiments of the present disclosure, a system may include a processor and a program of executable instructions embodied in non-transitory computer-readable media accessible to the processor. The program of executable instructions may be configured to, when read and executed by the processor, monitor for a failure of a storage resource in a pool of storage resources configured as a plurality of optimally-redundant virtual storage resources, determine if a virtual storage resource comprising the storage resource is able to rebuild the virtual storage resource, and, in response to determining that the virtual storage resource comprising the storage resource is unable to rebuild the virtual storage resource, migrate each of one or more virtual machines mapped to the virtual storage resource to another virtual storage resource in an optimal redundancy state.

18 Claims, 6 Drawing Sheets

(56) References Cited

U.S. PATENT DOCUMENTS

| | | | |
|---|---|---|---|
| 2012/0166886 A1* | 6/2012 | Shankar | G06F 11/2028 714/43 |
| 2014/0095826 A1* | 4/2014 | Rajagopal | G06F 3/0605 711/170 |
| 2014/0181397 A1* | 6/2014 | Bonzini | G06F 12/16 711/112 |

* cited by examiner

SYSTEMS AND METHODS FOR MIGRATION OF VIRTUAL MACHINES ACROSS VIRTUAL STORAGE RESOURCES

TECHNICAL FIELD

The present disclosure relates in general to information handling systems, and more particularly to live migration of virtual machines across virtual storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many computing applications, an information handling system includes a hypervisor for hosting one or more virtual machines. A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

Information handling systems and virtual machines often use an array of storage resources, such as a Redundant Array of Independent Disks (RAID), for example, for storing information. Arrays of storage resources typically utilize multiple disks to perform input and output operations and can be structured to provide redundancy which may increase fault tolerance. Other advantages of arrays of storage resources may be increased data integrity, throughput and/or capacity. In operation, one or more storage resources disposed in an array of storage resources may appear to an operating system as a single logical storage unit or "virtual storage resource." Implementations of storage resource arrays can range from a few storage resources disposed in a server chassis, to hundreds of storage resources disposed in one or more separate storage enclosures.

As a specific example, a user may implement a RAID configuration including one or more servers coupled to a number of storage enclosures containing hundreds of storage resources. In a typical configuration, a RAID may include active storage resources making up one or more virtual storage resources and one or more spare storage resources (also known as "hot spares"). In such a configuration, the storage resources configured as active spares generally may remain idle until a virtual storage resource suffers a failure of one of its active storage resources, at which time the virtual storage resource may rebuild itself using an active spare. However, situations may exist in which a spare storage resource is not available to rebuild a virtual storage resource after failure of an active storage resource, placing the virtual storage resource in what is known as a degraded state. In such a situation, failure of another active storage resource in the virtual storage resource may lead to loss of data.

SUMMARY

In accordance with the teachings of the present disclosure, the disadvantages and problems associated with hold-up times of existing power systems may be reduced or eliminated.

In accordance with these and other embodiments of the present disclosure, a system may include a processor and a program of executable instructions embodied in non-transitory computer-readable media accessible to the processor. The program of executable instructions may be configured to, when read and executed by the processor, monitor for a failure of a storage resource in a pool of storage resources configured as a plurality of optimally-redundant virtual storage resources, determine if a virtual storage resource comprising the storage resource is able to rebuild the virtual storage resource, and, in response to determining that the virtual storage resource comprising the storage resource is unable to rebuild the virtual storage resource, migrate each of one or more virtual machines mapped to the virtual storage resource to another virtual storage resource in an optimal redundancy state.

In accordance with these and other embodiments of the present disclosure, a method may include monitoring for a failure of a storage resource in a pool of storage resources configured as a plurality of optimally-redundant virtual storage resources and determining if a virtual storage resource comprising the storage resource is able to rebuild the virtual storage resource. The method may also include, in response to determining that the virtual storage resource comprising the storage resource is unable to rebuild the virtual storage resource, migrating each of one or more virtual machines mapped to the virtual storage resource to another virtual storage resource in an optimal redundancy state.

In accordance with these and other embodiments of the present disclosure, an article of manufacture may include a non-transitory computer readable medium and computer-executable instructions carried on the computer readable medium. The instructions may be readable by a processor, the instructions, when read and executed, for causing the processor to monitor for a failure of a storage resource in a pool of storage resources configured as a plurality of optimally-redundant virtual storage resources, determine if a virtual storage resource comprising the storage resource is able to rebuild the virtual storage resource, and, in response to determining that the virtual storage resource comprising the storage resource is unable to rebuild the virtual storage resource, migrate each of one or more virtual machines mapped to the virtual storage resource to another virtual storage resource in an optimal redundancy state.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
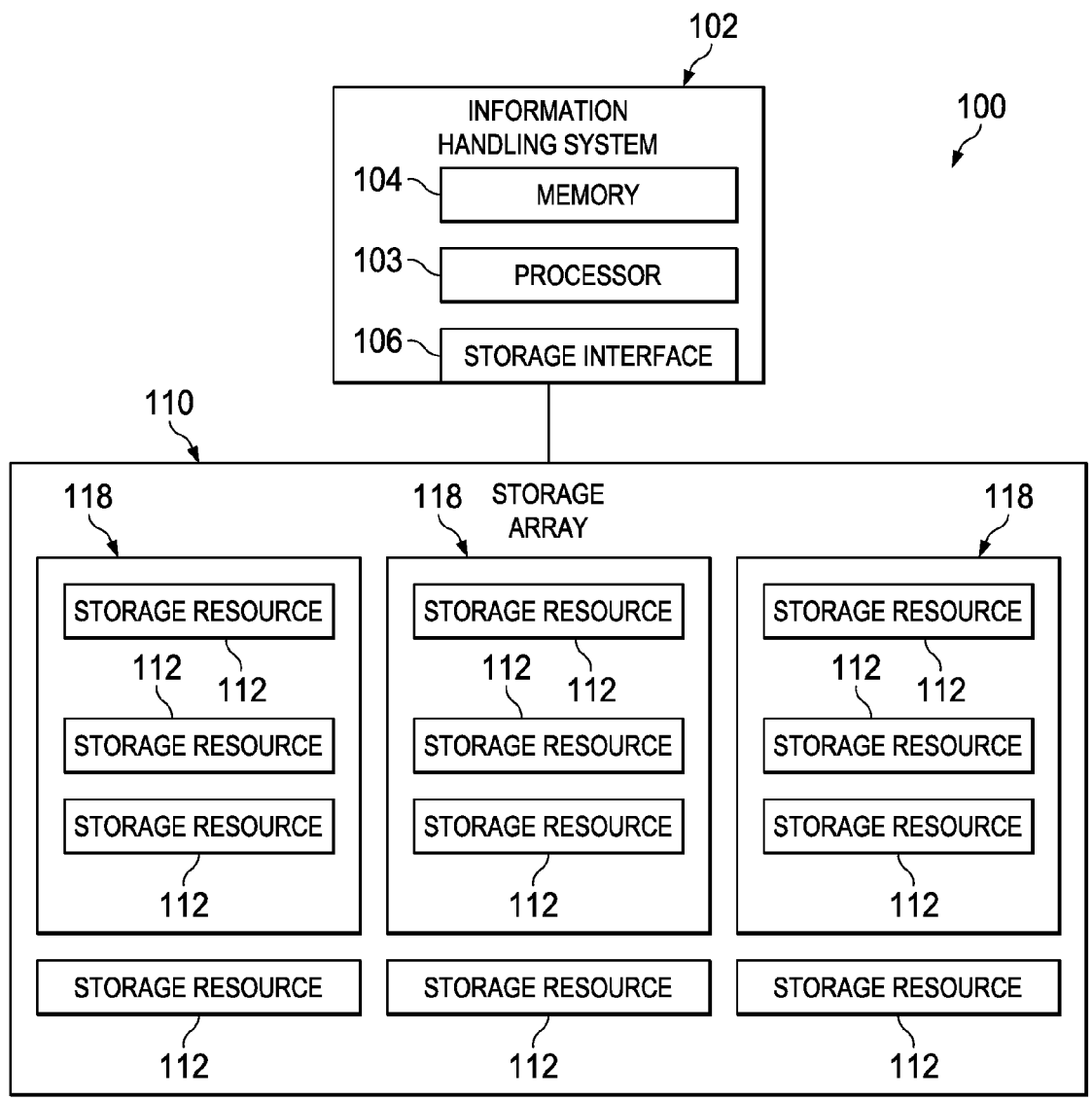
FIG. 1 illustrates a block diagram of an example system having an information handling system coupled to a storage array, in accordance with embodiments of the present disclosure.
Figure 2:
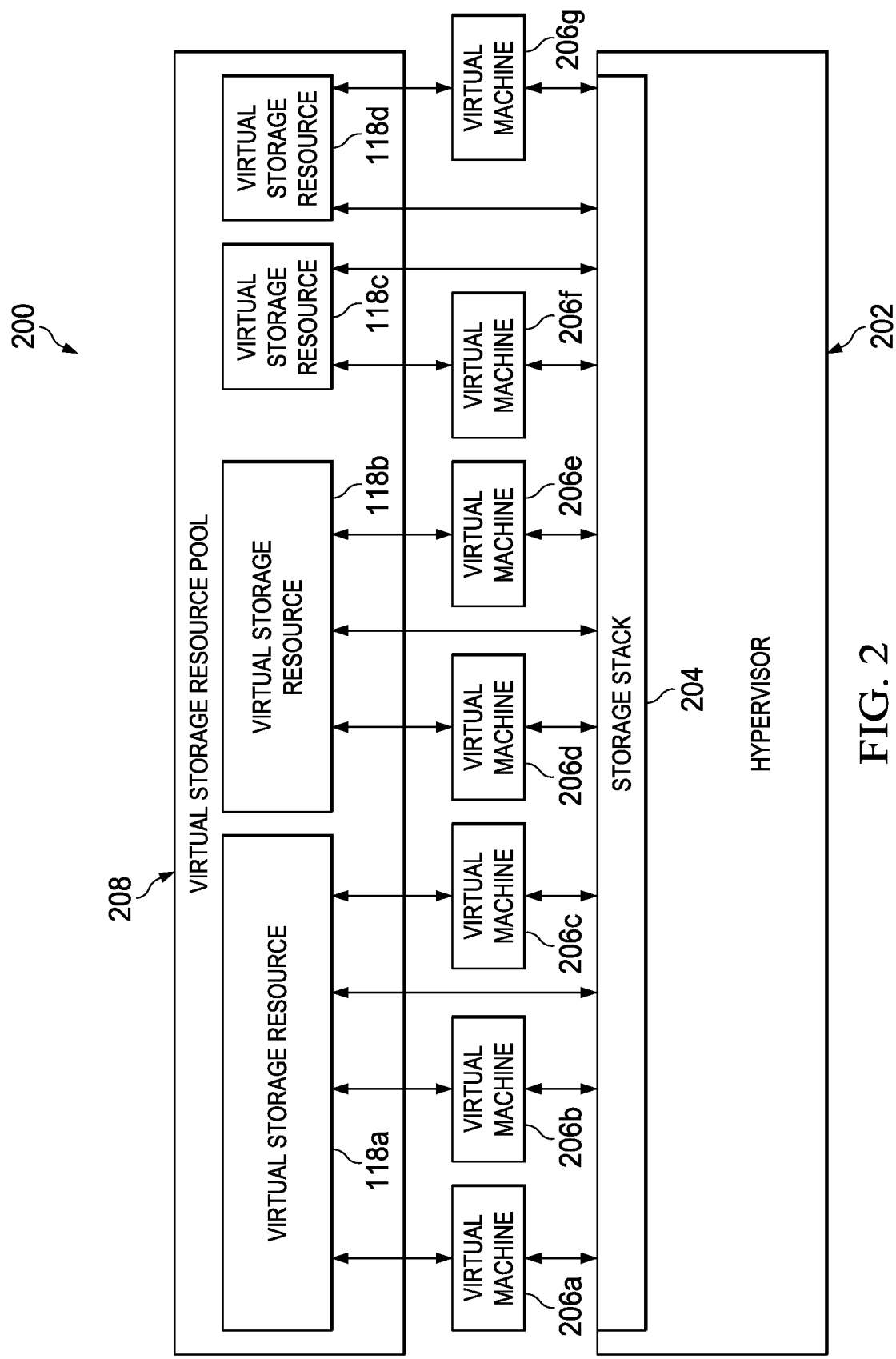
FIG. 2 illustrates a block diagram of a software hierarchy for migration of virtual machines across virtual storage resources, in accordance with embodiments of the present disclosure.
Figure 3:
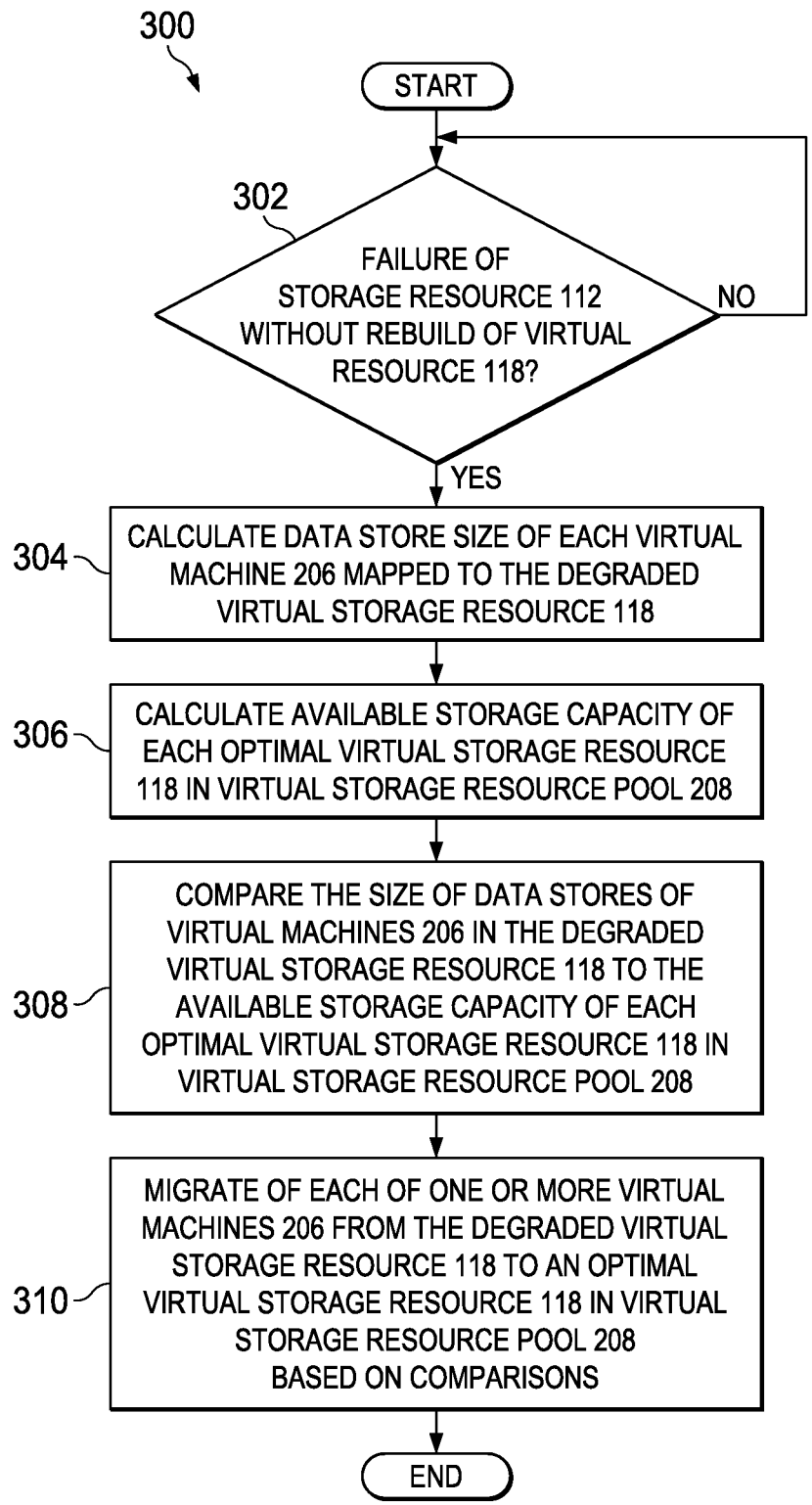
FIG. 3 illustrates a flow chart of an example method for migration of virtual machines across virtual storage resources, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having an information handling system 102 coupled to a storage array 110, in accordance with embodiments of the present disclosure.

In some embodiments, information handling system 102 may comprise a server. In these and other embodiments, information handling system 102 may comprise a personal computer. In other embodiments, information handling system 102 may be a portable computing device (e.g., a laptop, notebook, tablet, handheld, smart phone, personal digital assistant, etc.). As depicted in FIG. 1, information handling system 102 may include a processor 103, a memory 104 communicatively coupled to processor 103, and a storage interface 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage media 106, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage interface 106 may be communicatively coupled to processor 103 and may include any system, device, or apparatus configured to serve as an interface between processor 103 and storage resources 112 of storage array 110 to facilitate communication of data between processor 103 and storage resources 112 in accordance with any suitable standard or protocol. In some embodiments, storage interface 106 may comprise a network interface configured to interface with storage resources 112 located remotely from information handling system 102. In these and other embodiments, storage interface 106 may comprise a storage controller (e.g., a RAID controller).

In addition to processor 103, memory 104, and storage interface 106, information handling system 102 may include one or more other information handling resources.

Storage array 110 may include a plurality of physical storage resources 112. Storage resources 112 may be disposed in one or more storage enclosures configured to hold and power storage resources 112. Storage resources 112 may include hard disk drives, magnetic tape libraries, optical disk drives, magneto-optical disk drives, compact disk drives, compact disk arrays, disk array controllers, and/or any other system, apparatus or device operable to store media. In some embodiments, storage array 110 may comprise a user-created pool of optimal (e.g., non-degraded) virtual storage resources 118.

In operation, one or more storage resources 112 may appear to an operating system or virtual machine executing on information handling system 102 as a single logical storage unit or virtual storage resource 118. For example, each such virtual storage resource 118 may comprise a RAID. Thus, in some embodiments, a virtual storage resource 118 may comprise a redundant array of storage resources 112, wherein at least one of the storage resources 112 making up the virtual storage resource 118 enables data redundancy in order to avoid loss of data in the event of failure and/or removal of one of the storage resources making up the virtual storage resource. In the same or alternative embodiments, virtual storage resource 118 may be implemented using a RAID standard.

In addition to active storage resources 112 which may be members of virtual storage resources 118, storage array 110 may include one or more storage resources 112 acting as "spares." A spare storage resource 112 may also be referred to as a "hot spare" (particularly when used in a RAID implementation) and be any storage resource that is configured to replace an active storage resource 112 that has failed and/or been removed. In certain embodiments, storage array 110 may be configured such that a detection of a failure of an active storage resource 112 automatically initiates the replacement of the failed storage resource with a spare storage resource 112. In embodiments employing redundancy, the availability of spare storage resources 112 may reduce a repair period during which a second storage resource failure in the same virtual storage resource 118 group can result in loss of data.

Although in the embodiment depicted in FIG. 1 each virtual storage resource 118 is shown as including three storage resources 112, it is understood that a virtual storage resource 118 may comprise any number of storage resources.

In addition to storage resources 112, storage array 118 may include one or more other information handling resources.

In addition to information handling system 102 and storage array 110, system 100 may include one or more other information handling resources.

FIG. 2 illustrates a block diagram of a software hierarchy 200 for migration of virtual machines across virtual storage resources 118, in accordance with embodiments of the present disclosure. As shown in FIG. 2, software hierarchy 200 may include a hypervisor 202 with a plurality of virtual machines 206 (e.g., 206a-206g) executing thereon, and a virtual storage resource pool 208 comprising a plurality of virtual storage resources 118 (e.g., 118a-118d).

Hypervisor 202 may comprise software and/or firmware generally operable to allow multiple virtual machines and/or operating systems to run on a single information handling system (e.g., information handling system 102) at the same time. This operability is generally allowed via virtualization, a technique for hiding the physical characteristics of computing system resources (e.g., physical hardware of the computing system) from the way in which other systems, applications, or end users interact with those resources. Hypervisor 202 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, hypervisor 202 may comprise a specially-designed operating system (OS) with native virtualization capabilities. In another embodiment, hypervisor 202 may comprise a standard OS with an incorporated virtualization component for performing virtualization.

In another embodiment, hypervisor 202 may comprise a standard OS running alongside a separate virtualization application. In this embodiment, the virtualization application of hypervisor 202 may be an application running above the OS and interacting with information handling resources only through the OS. Alternatively, the virtualization application of hypervisor 202 may, on some levels, interact indirectly with information handling resources via the OS, and, on other levels, interact directly with information handling resources (e.g., similar to the way the OS interacts directly with information handling resources, or as firmware running on information handling resources). As a further alternative, the virtualization application of hypervisor 202 may, on all levels, interact directly with information handling resources (e.g., similar to the way the OS interacts directly with information handling resources, or as firmware running on information handling resources) without utilizing the OS, although still interacting with the OS to coordinate use of information handling resources. Active portions of hypervisor 202 may be transferred from storage media (e.g., storage resources 112) to memory 104 for execution by processor 103.

A virtual machine 206 may comprise any program of executable instructions, or aggregation of programs of executable instructions, configured to execute a guest OS in order to act through or in connection with hypervisor 202 to manage and/or control the allocation and usage of hardware resources such as memory, CPU time, disk space, and input and output devices, and provide an interface between such hardware resources and application programs hosted by the guest OS. In some embodiments, a guest OS may be a general-purpose OS such as WINDOWS or LINUX, for example. In other embodiments, a guest OS may comprise a specific- and/or limited-purpose OS. A guest OS of each virtual machine 206 may be transferred from storage media (e.g., storage resources 112) to memory 104 for execution by processor 103.

As shown in FIG. 2, hypervisor 202 may comprise a storage stack 204. As described in greater detail below, storage stack 204 may comprise any program of executable instructions, or aggregation of programs of executable instructions, configured for creating and managing a virtual storage resource pool 208, and migrating virtual machines 206 across virtual storage resources 118 in response to a failure of a storage resource 112 of a virtual storage resource 118.

In operation, storage stack 204 may provide a user (e.g., via a user interface of information handling system 102) an option for creating a virtual storage resource pool 208 (e.g., a pool of optimally-redundant virtual storage resources 118), as well as selecting or assigning virtual storage resources for inclusion in virtual storage resource pool 208. In addition, storage stack 204 may be configured to monitor which virtual machines 206 are mapped to which virtual storage resources 118 and to monitor health of individual virtual storage resources 118 of virtual storage resource pool 208. For example, monitoring of health may comprise monitoring whether a virtual storage resource 118 is in a degraded (e.g., non-redundant) or optimal (e.g., redundant) state, whether individual storage resources 112 are active, spare, or failed, and/or whether individual storage resources 112 are rebuilding. In addition, storage stack 204 may determine a data store size associated with a virtual machine 206, may determine a volume of free storage space in one or more virtual storage resources 118, and trigger migration of virtual machines 206 from a degraded virtual storage resource 118 to an optimal virtual storage resource 118.

FIG. 3 illustrates a flow chart of an example method 300 for migration of virtual machines 206 across virtual storage resources 118, in accordance with embodiments of the present disclosure. According to certain embodiments, method 300 may begin at step 302. As noted above, teachings of the present disclosure may be implemented in a variety of configurations of system 100 as shown in FIGS. 1 and 2. As such, the preferred initialization point for method 300 and the order of the steps comprising method 300 may depend on the implementation chosen.

At step 302, storage stack 204 may monitor for a failure of a storage resource 112 in any of virtual storage resources 118 integral to virtual storage resource pool 208. If such a failure occurs leaving a virtual storage resource 118 in a degraded state, and no rebuilding operation occurs (e.g., due to lack of spare storage resource 112), method 300 may proceed to step 304. Otherwise, method 302 may repeat until such a failure occurs.

At step 304, storage stack 204 may calculate the data store size of each virtual machine 206 mapped to the degraded virtual storage resource 118. At step 306, storage stack 204 may calculate the available storage capacity of each optimal virtual storage resource 118 in virtual storage resource pool 208.

At step 308, storage stack 204 may compare the size of data stores of virtual machines 206 in the degraded virtual storage resource 118 to the available storage capacity of each optimal virtual storage resource 118 in virtual storage resource pool 208.

Figure 4A:
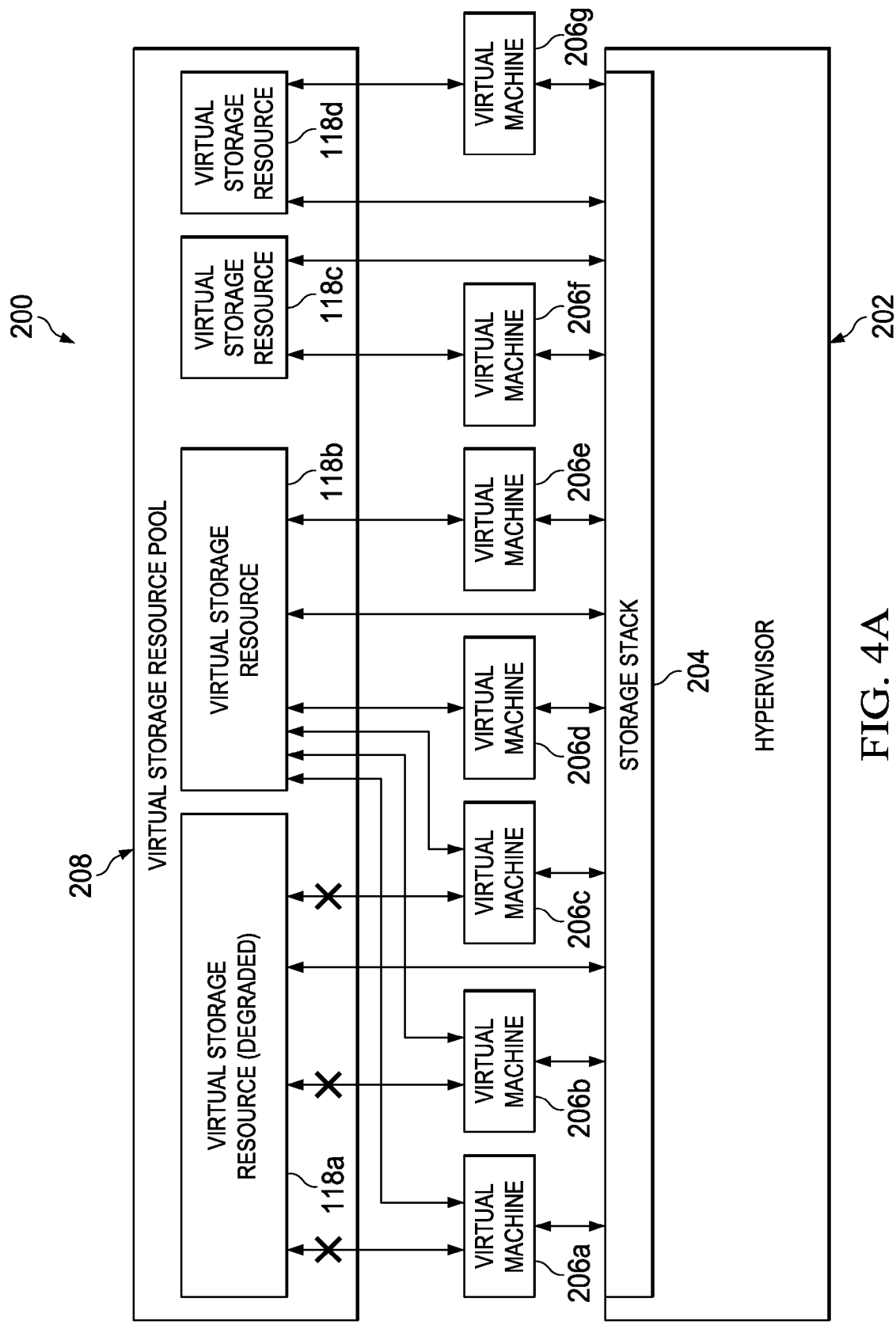
FIGS. 4A-4C illustrate block diagrams of the software hierarchy OF FIG. 2 showing migration of virtual machines across virtual storage resources, in accordance with embodiments of the present disclosure.

At step 310, storage stack 204 may trigger live migration of each of one or more virtual machines 206 from the degraded virtual storage resource 118 to an optimal virtual storage resource 118 in virtual storage resource pool 208 based on the comparisons of step 308. For example, if one of the optimal virtual storage resources 118 has sufficient available capacity to accommodate all virtual machines 206 of the degraded virtual storage resource 118, then storage stack 204 may migrate all virtual machines 206 of the degraded virtual storage resource 118 to such optimal virtual storage resource 118. Thus, as a specific example, if a failure without rebuild occurs in virtual storage resource 118a, and virtual storage resource 118b has sufficient capacity to accommodate the data of virtual machines 206a-206c, virtual machines 206a-206c may be migrated to virtual storage resource 118b, as shown in FIG. 4A.

Figure 4B:
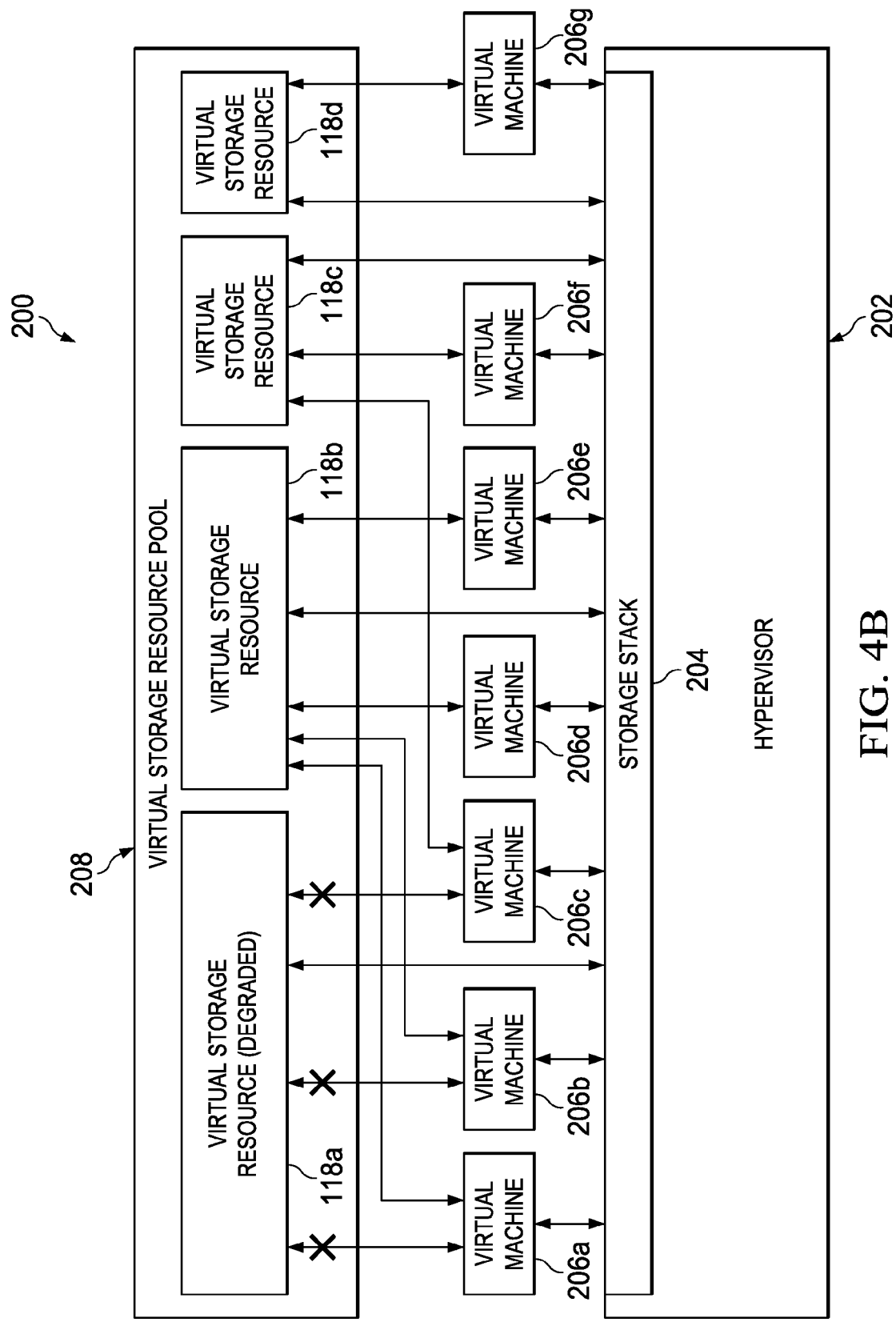

If one of the optimal virtual storage resources 118 has sufficient available capacity to accommodate all virtual machines 206 of the degraded virtual storage resource 118, then the data store sizes of each affected virtual machine 206 may be compared with the available capacity of each optimal virtual storage resource 118, and the affected virtual machines 206 may be migrated in an optimized fashion to optimal virtual storage resources 118 having sufficient available capacity. Thus, as a specific example, if a failure without rebuild occurs in virtual storage resource 118a, virtual machines 206a and 206b may be migrated to virtual storage resource 118b while virtual machine 206c may be migrated to virtual storage resource 118c, as shown in FIG. 4B.

Figure 4C:
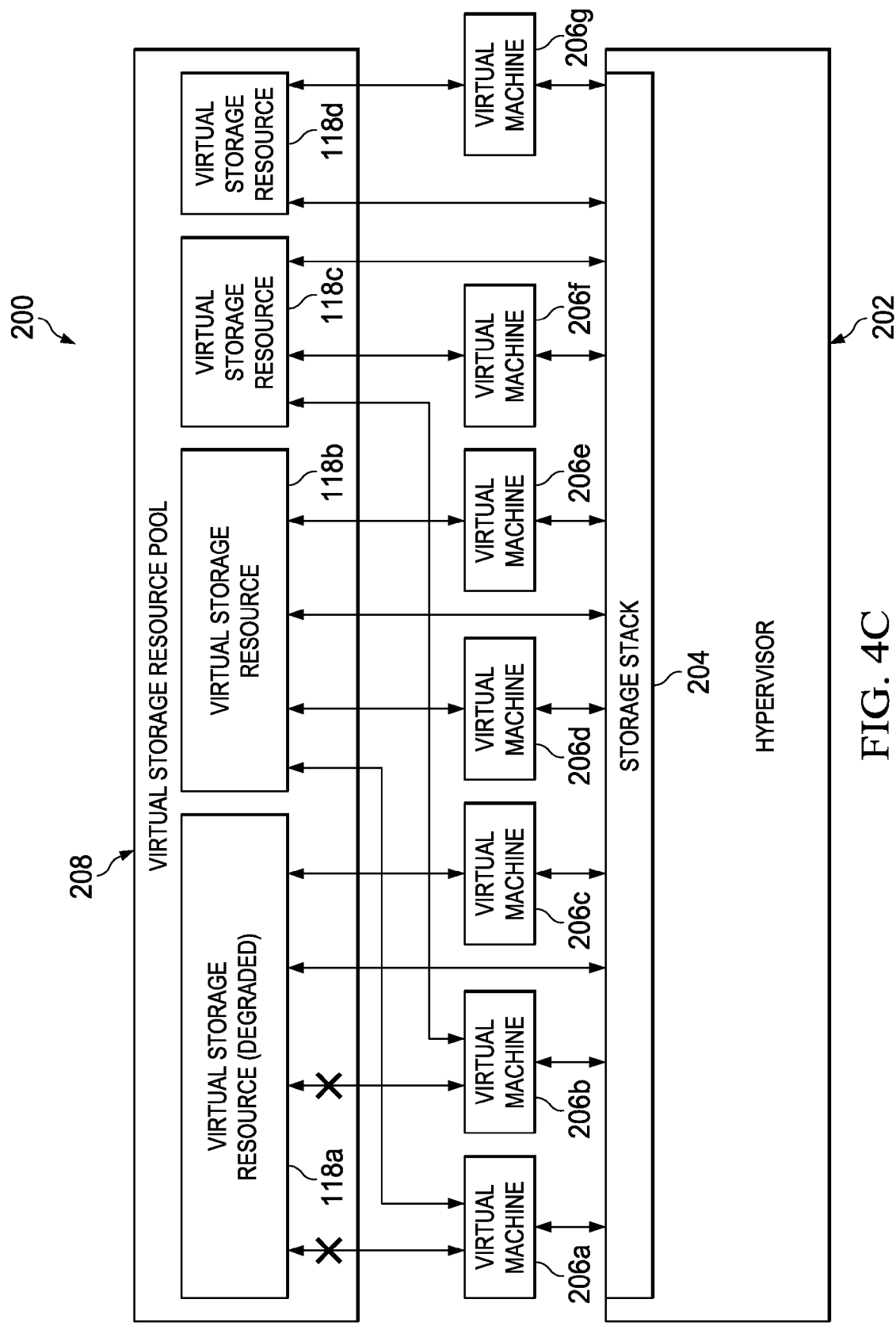

If the optimal virtual storage resources 118 in the aggregate do not have sufficient capacity to accommodate all of the affected virtual machines 206, then only some of the affected virtual machines 206 may be migrated. As a specific example, if a failure without rebuild occurs in virtual storage resource 118a and the remaining available capacity in other virtual storage resources 118 of virtual storage resource pool 208 is sufficient to accommodate virtual machines 206a, 206b, and 206, then only a portion (e.g., virtual machines 206a and 206b) may be migrated. In such situations, such virtual machines 206 may be given priority for migration in accordance with a user preference or setting. As a specific example, if a failure without rebuild occurs in virtual storage resource 118a, virtual machines 206a may be migrated to virtual storage resource 118b while virtual machine 206b may be migrated to virtual storage resource 118c, but sufficient capacity may not be available to migrate virtual machine 206c, as shown in FIG. 4C.

After completion of step 310, method 300 may end.

Although FIG. 3 discloses a particular number of steps to be taken with respect to method 300, it may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100, components thereof or any other system such as those shown in FIGS. 1 and 2 operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
   a processor; and
   hardware resources, accessible to the processor, including
   a non-transitory computer readable medium comprising instructions, executable by the processor, wherein the instructions include:
   virtual machine instructions that, when executed by the processor, cause the processor to maintain one or more virtual machines, each of the one or more virtual machines executing, in connection with a hypervisor, a corresponding guest operating system to manage allocation and usage of the hardware resources; and
   program instructions that, when read and executed by the processor, cause the processor to perform operations comprising:
   monitoring for a failure of a storage resource in a pool of storage resources configured as a plurality of optimally-redundant virtual storage resources;
   determining if a virtual storage resource comprising the storage resource is able to rebuild the virtual storage resource; and
   in response to determining that the virtual storage resource comprising the storage resource is unable to rebuild the virtual storage resource, migrating each of the one or more virtual machines mapped to the virtual storage resource to another virtual storage resource in an optimal redundancy state.

2. The system of claim 1, wherein migrating each of one or more virtual machines mapped to the virtual storage resource to another virtual storage resource in an optimal redundancy state comprises:
   calculating a data store size of each of one or more virtual machines mapped to the virtual storage resource;
   calculating an available storage capacity for each other virtual storage resource within the pool that is in an optimal redundancy state;
   comparing the data store sizes of each of one or more virtual machines mapped to the virtual storage resource to the available storage capacities for each other virtual storage resource within the pool that is in an optimal redundancy state; and
   migrating one or more of the virtual machines mapped to the virtual storage resource based on the comparisons.

3. The system of claim 1, wherein migrating each of one or more virtual machines mapped to the virtual storage resource to another virtual storage resource in an optimal redundancy state comprises migrating each of one or more virtual machines mapped to the virtual storage resource to a single virtual storage resource within the pool that is in an optimal redundancy state.

4. The system of claim 1, wherein migrating each of one or more virtual machines mapped to the virtual storage resource to another virtual storage resource in an optimal redundancy state comprises migrating a first virtual machine mapped to the virtual storage resource to a second virtual storage resource in the pool that is in an optimal redundancy state and migrating a second virtual machine mapped to the virtual storage resource to a third virtual storage resource in the pool that is in an optimal redundancy state.

5. The system of claim 1, wherein migrating each of one or more virtual machines mapped to the virtual storage resource to another virtual storage resource in an optimal redundancy state comprises migrating a first virtual machine mapped to the virtual storage resource to another virtual storage resource in the pool that is in an optimal redundancy state and maintaining a second virtual machine mapped to the virtual storage resource without migration from the virtual storage resource.

6. The system of claim 1, wherein the pool is a user-defined plurality of optimally-redundant virtual storage resources.

7. A method, comprising:
   maintaining one or more virtual machines, each of the one or more virtual machines executing, in connection with a hypervisor, a corresponding guest operating system to manage allocation and usage of the hardware resources;
   monitoring for a failure of a storage resource in a pool of storage resources configured as a plurality of optimally-redundant virtual storage resources;
   determining if a virtual storage resource comprising the storage resource is able to rebuild the virtual storage resource; and
   in response to determining that the virtual storage resource comprising the storage resource is unable to rebuild the virtual storage resource, migrating each of the one or more virtual machines mapped to the virtual storage resource to another virtual storage resource in an optimal redundancy state.

8. The method of claim 7, wherein migrating each of one or more virtual machines mapped to the first virtual storage resource to another virtual storage resource in an optimal redundancy state comprises:
   calculating a data store size of each of one or more virtual machines mapped to the virtual storage resource;
   calculating an available storage capacity for each other virtual storage resource within the pool that is in an optimal redundancy state;

comparing the data store sizes of each of one or more virtual machines mapped to the virtual storage resource to the available storage capacities for each other virtual storage resource within the pool that is in an optimal redundancy state; and migrating one or more of the virtual machines mapped to the virtual storage resource based on the comparisons.

9. The method of claim 7, wherein migrating each of one or more virtual machines mapped to the virtual storage resource to another virtual storage resource in an optimal redundancy state comprises migrating each of one or more virtual machines mapped to the virtual storage resource to a single virtual storage resource within the pool that is in an optimal redundancy state.

10. The method of claim 7, wherein migrating each of one or more virtual machines mapped to the virtual storage resource to another virtual storage resource in an optimal redundancy state comprises migrating a first virtual machine mapped to the virtual storage resource to a second virtual storage resource in the pool that is in an optimal redundancy state and migrating a second virtual machine mapped to the virtual storage resource to a third virtual storage resource in the pool that is in an optimal redundancy state.

11. The method of claim 7, wherein migrating each of one or more virtual machines mapped to the virtual storage resource to another virtual storage resource in an optimal redundancy state comprises migrating a first virtual machine mapped to the virtual storage resource to another virtual storage resource in the pool that is in an optimal redundancy state and maintaining a second virtual machine mapped to the virtual storage resource without migration from the virtual storage resource.

12. The method of claim 7, wherein the pool is a user-defined plurality of optimally-redundant virtual storage resources.

13. An article of manufacture comprising:
a non-transitory computer readable medium; and
computer-executable instructions carried on the computer readable medium, the instructions readable by a processor, the instructions, when read and executed, for causing the processor to:
maintaining one or more virtual machines, each of the one or more virtual machines executing, in connection with a hypervisor, a corresponding guest operating system to manage allocation and usage of the hardware resources;
monitoring for a failure of a storage resource in a pool of storage resources configured as a plurality of optimally-redundant virtual storage resources;
determining if a virtual storage resource comprising the storage resource is able to rebuild the virtual storage resource; and in response to determining that the virtual storage resource comprising the storage resource is unable to rebuild the virtual storage resource, migrating each of one or more virtual machines mapped to the virtual storage resource to another virtual storage resource in an optimal redundancy state.

14. The article of claim 13, wherein migrating each of one or more virtual machines mapped to the first virtual storage resource to another virtual storage resource in an optimal redundancy state comprises:
calculating a data store size of each of one or more virtual machines mapped to the virtual storage resource;
calculating an available storage capacity for each other virtual storage resource within the pool that is in an optimal redundancy state;
comparing the data store sizes of each of one or more virtual machines mapped to the virtual storage resource to the available storage capacities for each other virtual storage resource within the pool that is in an optimal redundancy state; and
migrating one or more of the virtual machines mapped to the virtual storage resource based on the comparisons.

15. The article of claim 13, wherein migrating each of one or more virtual machines mapped to the virtual storage resource to another virtual storage resource in an optimal redundancy state comprises migrating each of one or more virtual machines mapped to the virtual storage resource to a single virtual storage resource within the pool that is in an optimal redundancy state.

16. The article of claim 13, wherein migrating each of one or more virtual machines mapped to the virtual storage resource to another virtual storage resource in an optimal redundancy state comprises migrating a first virtual machine mapped to the virtual storage resource to a second virtual storage resource in the pool that is in an optimal redundancy state and migrating a second virtual machine mapped to the virtual storage resource to a third virtual storage resource in the pool that is in an optimal redundancy state.

17. The article of claim 13, wherein migrating each of one or more virtual machines mapped to the virtual storage resource to another virtual storage resource in an optimal redundancy state comprises migrating a first virtual machine mapped to the virtual storage resource to another virtual storage resource in the pool that is in an optimal redundancy state and maintaining a second virtual machine mapped to the virtual storage resource without migration from the virtual storage resource.

18. The article of claim 13, wherein the pool is a user-defined plurality of optimally-redundant virtual storage resources.

* * * * *